(12) United States Patent
Kirscht et al.

(10) Patent No.: US 8,984,236 B2
(45) Date of Patent: Mar. 17, 2015

(54) EVENT-BASED EXECUTION BUFFER MANAGEMENT

(71) Applicant: International Business Machines Corporation, Armonk, NY (US)

(72) Inventors: Joseph A. Kirscht, Rochester, MN (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/742,156

(22) Filed: Jan. 15, 2013

(65) Prior Publication Data

US 2014/0201476 A1  Jul. 17, 2014

(51) Int. Cl.
G06F 12/10 (2006.01)
G06F 12/16 (2006.01)
G06F 12/00 (2006.01)
G06F 3/06 (2006.01)

(52) U.S. Cl.
CPC .......... *G06F 12/16* (2013.01); *G06F 12/00* (2013.01); *G06F 3/0656* (2013.01)
USPC .......................................................... 711/147

(58) Field of Classification Search
None
See application file for complete search history.

(56) References Cited

U.S. PATENT DOCUMENTS

| 6,856,950 | B1 | 2/2005 | Abts et al. |
| 7,515,526 | B2 | 4/2009 | Elkayam et al. |
| 7,908,501 | B2 | 3/2011 | Kim et al. |
| 2007/0047436 | A1 | 3/2007 | Arai et al. |
| 2007/0288784 | A1 | 12/2007 | Koper et al. |
| 2008/0219247 | A1 | 9/2008 | Ford et al. |

OTHER PUBLICATIONS

U.S. Appl. No. 13/742,156, entitled "Event-Based Execution Buffer Management", filed Jan. 15, 2013.

*Primary Examiner* — Duc Doan
(74) *Attorney, Agent, or Firm* — Patterson & Sheridan, LLP

(57) ABSTRACT

Techniques for reacting to events in a switch module. Embodiments provide a plurality of predefined load/store operations stored in a first memory buffer of the switch module. An execution buffer capable of storing load/store operations within the switch module is also provided. Responsive to detecting that a first predefined event has occurred, embodiments copy the plurality of predefined load/store operations from the first memory buffer to the execution buffer for execution. Upon detecting the plurality of predefined load/store operations within the execution buffer, the plurality of predefined load/store operations within the execution buffer are executed.

16 Claims, 9 Drawing Sheets

EVENT-BASED EXECUTION BUFFER MANAGEMENT

BACKGROUND

The present invention relates to computer networking, and more specifically, to techniques for reacting to events within a distributed switch module using a set of predefined load/store operations.

Computer systems often use multiple computers that are coupled together in a common chassis. The computers may be separate servers that are coupled by a common backbone within the chassis. Each server may be a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

Additionally, the switch itself may be a distributed system. For example, the distributed switch may include a plurality of switch modules and one or more control modules. Generally, the switch modules may each include a respective set of ports and could be configured to act as independent sub-switches. The control module(s) could provide control plane logic for the plurality of switch modules, and the control module(s) may be shared by the plurality of switch modules. One advantage to such a distributed switch is that distributed systems can oftentimes grow larger than conventional systems at less cost. Additionally, distributed systems are frequently more modular then conventional systems, allowing faulty, individual components to be isolated and replaced in a more efficient and inexpensive fashion.

SUMMARY

Embodiments provide a method, computer-readable storage medium and switch module for reacting to events. The method, computer-readable storage medium and switch module include providing (i) a plurality of predefined load/store operations stored in a first memory buffer of the switch module and (ii) an execution buffer capable of storing load/store operations within the switch module. Additionally, the method, computer-readable storage medium and switch module include responsive to detecting that a first predefined event has occurred, copying the plurality of predefined load/store operations from the first memory buffer to the execution buffer for execution. The method, computer-readable storage medium and switch module also include, upon detecting the plurality of predefined load/store operations within the execution buffer, executing the plurality of predefined load/store operations within the execution buffer.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
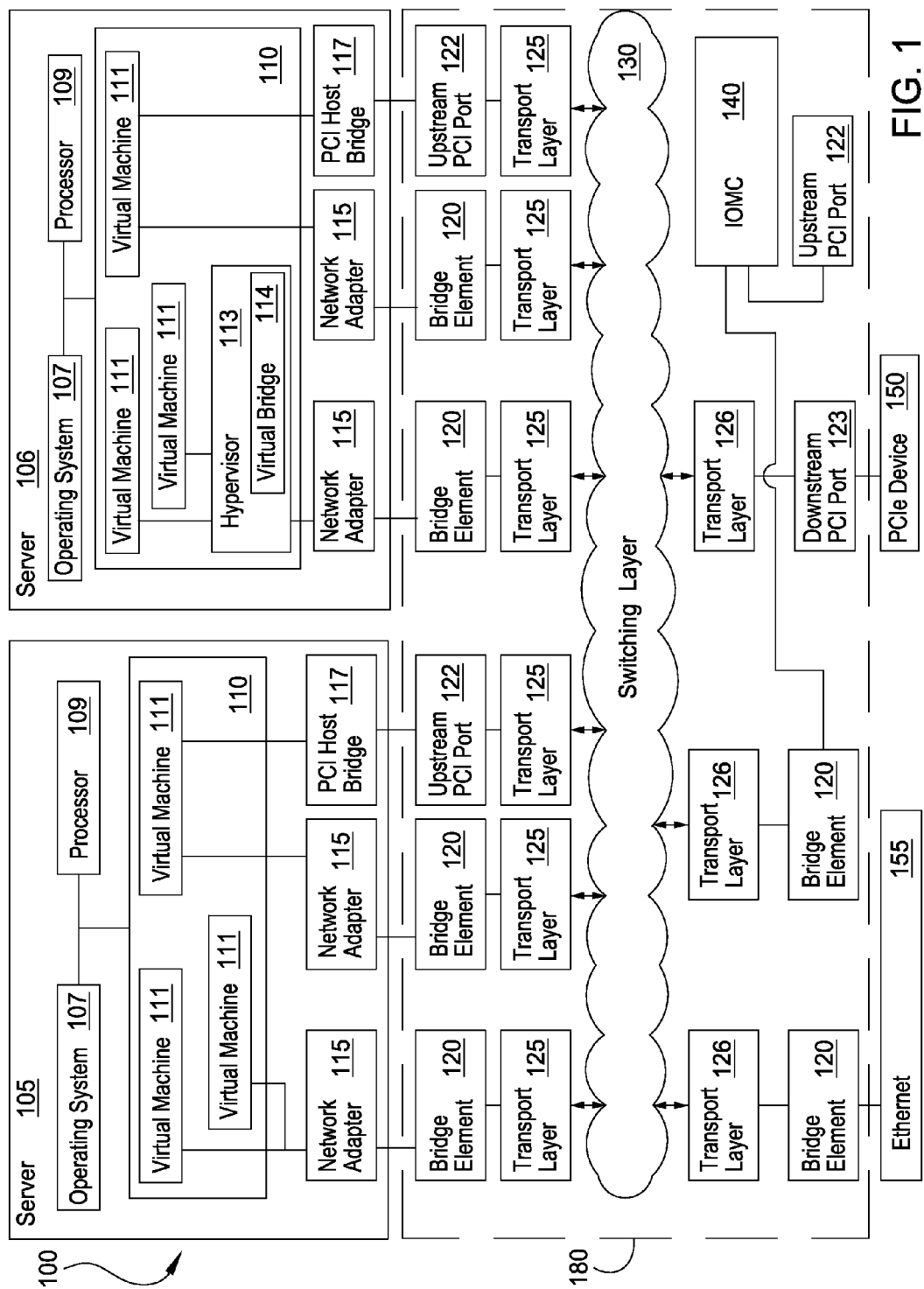
FIG. 1 illustrates a system architecture that includes a distributed, virtual switch, according to one embodiment described herein.

Generally, a distributed, virtual switch may include a plurality of switch modules, each of which contains a set of ports and logic to direct traffic between the ports. The distributed switch may also include one or more control modules (also referred to herein as a "switch management controller"), which provide control plane logic for the plurality of switch modules and are shared by the plurality of switch modules. Doing so can allow distributed switches to scale to larger sizes for less cost than conventional switches.

In some circumstances, it may be desirable for individual switch modules within a distributed switch to react to particular events. As an example, if a switch module loses connectivity to its switch management controller (which provides the control plane logic for the switch module), it may be desirable for the switch module to disable all of its ports until the connectivity issue can be resolved. That is, since the switch module can no longer receive control plane updates from the switch management controller, the switch module has no way of knowing how to correctly route the network data it receives. Thus, the switch module may be configured to disable all of its ports upon determining that connectivity with the switch management controller has been lost.

As such, embodiments provide techniques for reacting to events in a switch module. Embodiments provide a plurality of predefined load/store operations stored in a first memory buffer of the switch module. Generally, the load/store operations relate to loading values into at least one of the registers (i.e., a load operation) and/or storing a value from at least one of the registers in a memory of the switch module (i.e., a store operation). However, it is broadly contemplated that load/store operations, as used herein, can include more than simple load and store register operations, and more generally may include any operations related to loading, storing and/or modifying values within registers. For example, the load/store operations could include, without limitation, a load operation (e.g., that reads a 64 bit value from a register), a store operation (e.g., the writes a 64 bit value to a register), an AND operation (e.g., that reads a 64 bit value from a register, applies a 64 bit AND mask to zero out any combination of bits, and stores the updated 64 bit value back to the same register), an OR operation (e.g., the reads a 64 bit value from a register, applies a 64 bit OR mask to set any combination of bits to "1", and stores the updated 64 bit value back to the same register), a COMPARE/SWAP operation (e.g., that reads a 64 bit value, compares the value to a command-supplied COMPARE value, and stores a command-supplied SWAP value back to the same register if the comparison is TRUE), and an ANDOR operation (e.g., that reads a 64 bit value from a register, applies an AND mask to set any combination of bits to "0", applies an OR mask to set any combination of bits to "1", and stores the resulting 64 bit value back to the same register). Still other commands may include, without limitation, a sequential load operation (e.g., a load operation that targets multiple registers having sequential addresses), a sequential store operation, a sequential AND operation, a sequential OR operation, a sequential COMPARE/SWAP operation, and a sequential AND/OR operation. However, all of the above examples are provided for illustrative purposes only, and one of ordinary skill in the art will quickly recognize that examples of load/store operations can include these and many other operations, consistent with the present disclosure.

Additionally, an execution buffer capable of storing load/store operations is provided within the switch module. The switch module may be further configured with logic that executes load/store operations contained within the execution buffer. For instance, such logic could periodically poll the execution buffer and, upon determining that the execution buffer contains load/store operations that have not yet been executed, could execute the contents of the execution buffer. Responsive to detecting an occurrence of a first predefined event, embodiments copy the plurality of predefined load/store operations from the first memory buffer to the execution buffer for execution.

Thus, for example, a switch module could be preconfigured with a set of load/store operations that, when executed, disable all of the ports on the switch module. For instance, a switch module could contain 32 ports and a respective configuration register for each of the 32 ports. Here, each of the configuration registers may contain a status value indicative of the status of its associated port (e.g., a value of "0" for disabled and a value of "1" for enabled). In such an example, the switch module could be configured with a set of load/store operations that, when executed, write a value to each of the configuration registers to disable the associated port, thereby disabling all of the ports on the switch module.

Additionally, the switch module could be configured with a timer that expires after some set amount of time has elapsed. The switch management controller could be configured to periodically transmit a heartbeat signal to the switch module and logic on the switch module could be configured to reset the timer whenever a heartbeat signal is received from the switch management controller. Upon expiration of the timer (i.e., when a heartbeat signal has not been received from the switch management controller for the set amount of time), logic on the switch module may determine that the switch management controller is no longer available and may copy the set of predefined load/store operations into the execution buffer. Logic on the switch module could then execute the set of load/store operations to disable all of the ports on the switch module.

These techniques for reacting to events on a switch module are discussed in more detail in Section II below. However, Section I first describes an exemplary environment in which embodiments may be implemented. Of note, while embodiments may be implemented in the distributed switch environment described in Section I, such an environment is provided for illustrative purpose only and without limitation. Moreover, it is broadly contemplated that embodiments may implemented in any switch or network environment, consistent with the functionality described herein.

I. Distributed Switch Infrastructure

A distributed, virtual switch may appear as a single switch element to a computing system (e.g., a server) connected to the distributed switch. In reality, the distributed switch may include a plurality of different switch modules that are interconnected via a switching layer such that each of the switch modules may communicate with any other of the switch modules. For example, a computing system may be physically connected to a port of one switch module but, using the switching layer, is capable of communicating with a different switch module that has a port connected to a WAN (e.g., the Internet). Moreover, each of the switch modules may be configured to accept and route data based on two different communication protocols. To the computing system, however, the two separate switch modules appear to be one single switch.

The distributed switch may include a plurality of chips (i.e., sub-switches) on each switch module. These sub-switches may receive a multicast data frame (e.g., an Ethernet frame) that designates a plurality of different destination sub-switches. The sub-switch that receives the data frame is responsible for creating copies of a portion of the frame, such as the frame's payload, and forwarding that portion to the respective destination sub-switches using the fabric of the distributed switch. However, instead of simply using one egress connection interface to forward the copies of the data frame to each of the destinations sequentially, the sub-switch may use a plurality of connection interfaces to transfer copies of the data frame in parallel. For example, a sub-switch may have a plurality of Tx/Rx ports that are each associated with a connection interface that provides connectivity to the other sub-switches in the distributed switch. The port that receives the multicast data frame can borrow the connection interfaces (and associated hardware) assigned to these other ports to transmit copies of the multicast data frame in parallel.

In addition, these sub-switches may be arranged in a hierarchical structure where one or more sub-switches are selected to act as surrogates. The sub-switches of the distributed switch are grouped together where each group is assigned to one or more of the surrogates. When a sub-switch receives a multicast data frame, it forwards the packet to one of the surrogate sub-switches. Each surrogate sub-switch may then forward the packet to another surrogate or to a destination sub-switch. Because the surrogates may also transmit the packets in parallel using two or more connection interfaces, the bandwidth used to forward the multicast packet increases for each surrogate used.

Further, the surrogate hierarchy may be configured to be compatible with link aggregation where multiple physical connections are grouped together to create an aggregated (logical) link. Link aggregation requires similar data frames to use the same data path when traversing the distributed switch. With a unicast data frame, the sub-switch that receives the data frame typically identifies the destination port (based on a hash key) and forwards the data frame to the sub-switch with that port. However, with multicast data frames, it may be impossible to store information about every port in the distributed switch on each sub-switch. Instead, the sub-switch that receives the multicast data frame may not identify the destination port but instead forward the multicast data according to the hierarchy.

In one embodiment, the multicast data is forwarded to at least two sub-switches that each have at least one local port that belongs to the same aggregated link. Because the Link Aggregation Protocol permits only one of these local ports to be the selected port, each sub-switch performs link selection using the same hash value to determine if its local port is the selected port. If the local port is the selected port, the sub-switch transmits the multicast data frame using the selected port. If not, the sub-switch disregards the multicast data.

In another embodiment, only one port is enabled for each aggregated link in a multicast group. The multicast data traverses the surrogate hierarchy until it reaches the sub-switch with the enabled port. The sub-switch then performs link selection to determine which of the ports in the trunk is the selected port. If the selected port is the local enabled port on the sub-switch, then the sub-switch uses that port to transmit the multicast data. If not, the sub-switch determines which port in the aggregated link is the selected port and forwards the multicast data to the sub-switch that contains the selected port.

In another embodiment, link selection is never performed. Like in the previous embodiment, in this embodiment, only one port is enabled for each aggregated link in a multicast group. The multicast data traverses the surrogate hierarchy until it reaches the sub-switch with the enabled port. However, the sub-switch never uses the hash value to determine which of the ports in the aggregated link is the selected port. Instead, all the multicast traffic for that aggregated link in the MC group is transmitted through the enabled port rather than being dispersed across the different ports of the aggregated link based on the hash key.

FIG. 1 illustrates a system architecture that includes a distributed virtual switch, according to one embodiment described herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may be considered to include memory storage physically located in the server 105 or on another computing device coupled to the server 105.

The server 105 may operate under the control of an operating system 107 and may execute various computer software applications, components, programs, objects, modules, and data structures, such as virtual machines 111. The server 105 may include network adapters 115 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using an Ethernet or PCI based communication method and may be coupled to one or more of the virtual machines 111. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge 117 would then connect to an upstream PCI port 122 on a switch element in the distributed switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed virtual switch 180. For example, a network adapter 115 and bridge element 120 may be connected using two 40 Gbit Ethernet connections or one 100 Gbit Ethernet connection. The bridge elements 120 forward the data frames received by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed switch 180.

The distributed virtual switch 180, in general, includes a plurality of bridge elements 120 that may be located on a plurality of a separate, though interconnected, hardware components. To the perspective of the network adapters 115, the switch 180 acts like one single switch even though the switch 180 may be composed of multiple switches that are physically located on different components. Distributing the switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect with dedicated connections which connect bridge elements 120 located within the same chassis and rack, as well as links for connecting to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the switch 180.

Although "upstream" and "downstream" are used to describe the PCI ports, this is only used to illustrate one possible data flow. For example, the downstream PCI port 123 may in one embodiment transmit data from the connected to the PCIe device 150 to the upstream PCI port 122. Thus, the PCI ports 122, 123 may both transmit as well as receive data.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special-purpose processor) is coupled to at least one bridge element 120 or upstream PCI port 122 which provides the IOMC 140 with access to the switching layer 130. One function of the IOMC 140 may be to receive commands from an administrator to configure the different hardware elements of the distributed virtual switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members (or slaves).

Figure 2:
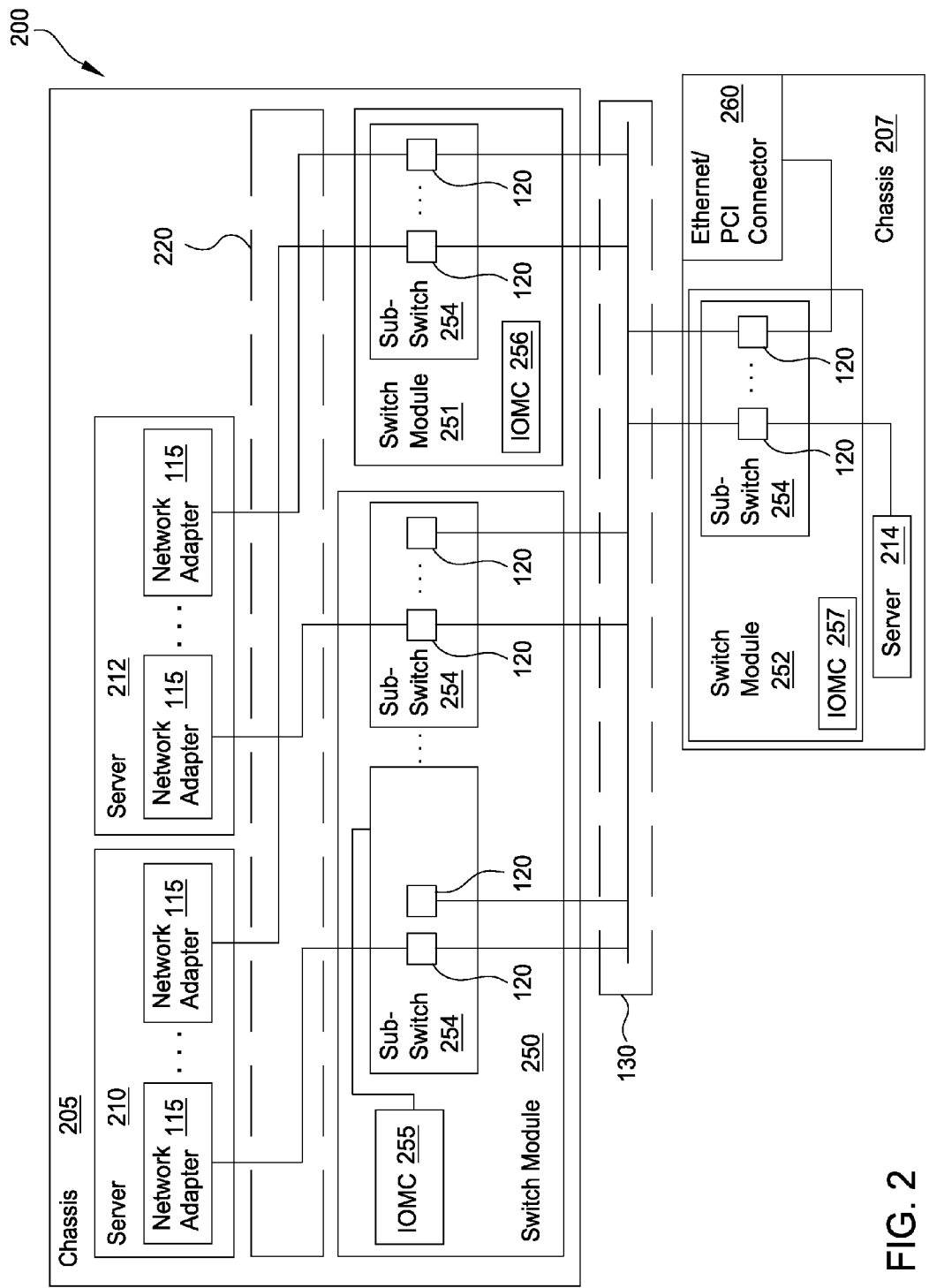
FIG. 2 illustrates the hardware representation of a system that implements a distributed, virtual switch, according to one embodiment described herein.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254 (i.e., a microchip). In one embodiment, the switch modules 250, 251, 252 are hardware components (e.g., PCB boards, FPGA boards, etc.) that provide physical support and connectivity between the network adapters 115 and the bridge elements 120. In general, the switch modules 250, 251, 252 include hardware that connects different chassis 205, 207 and servers 210, 212, 214 in the system 200 and may be a single, replaceable part in the computing system.

The switch modules 250, 251, 252 (e.g., a chassis interconnect element) include one or more sub-switches 254 and an IOMC 255, 256, 257. The sub-switches 254 may include a logical or physical grouping of bridge elements 120—e.g., each sub-switch 254 may have five bridge elements 120. Each bridge element 120 may be physically connected to the servers 210, 212. For example, a bridge element 120 may route data sent using either Ethernet or PCI communication protocols to other bridge elements 120 attached to the switching layer 130 using the routing layer. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module. As discussed above, the IOMCs 255, 256, 257 are attached to at least one sub-switch 254 (or bridge element 120) in each switch module 250, 251, 252 which enables each IOMC to route commands on the switching layer 130. For clarity, these connections for IOMCs 256 and 257 have been omitted. Moreover, switch modules 251, 252 may include multiple sub-switches 254.

The dotted line in chassis 205 defines the midplane 220 between the servers 210, 212 and the switch modules 250, 251. That is, the midplane 220 includes the data paths (e.g., conductive wires or traces) that transmit data between the network adapters 115 and the sub-switches 254.

Each bridge element 120 connects to the switching layer 130 via the routing layer. In addition, a bridge element 120 may also connect to a network adapter 115 or an uplink. As used herein, an uplink port of a bridge element 120 provides a service that expands the connectivity or capabilities of the system 200. As shown in chassis 207, one bridge element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridge elements 120 to update the routing tables and lookup tables to include the hardware elements on the new switching module.

Figure 3:
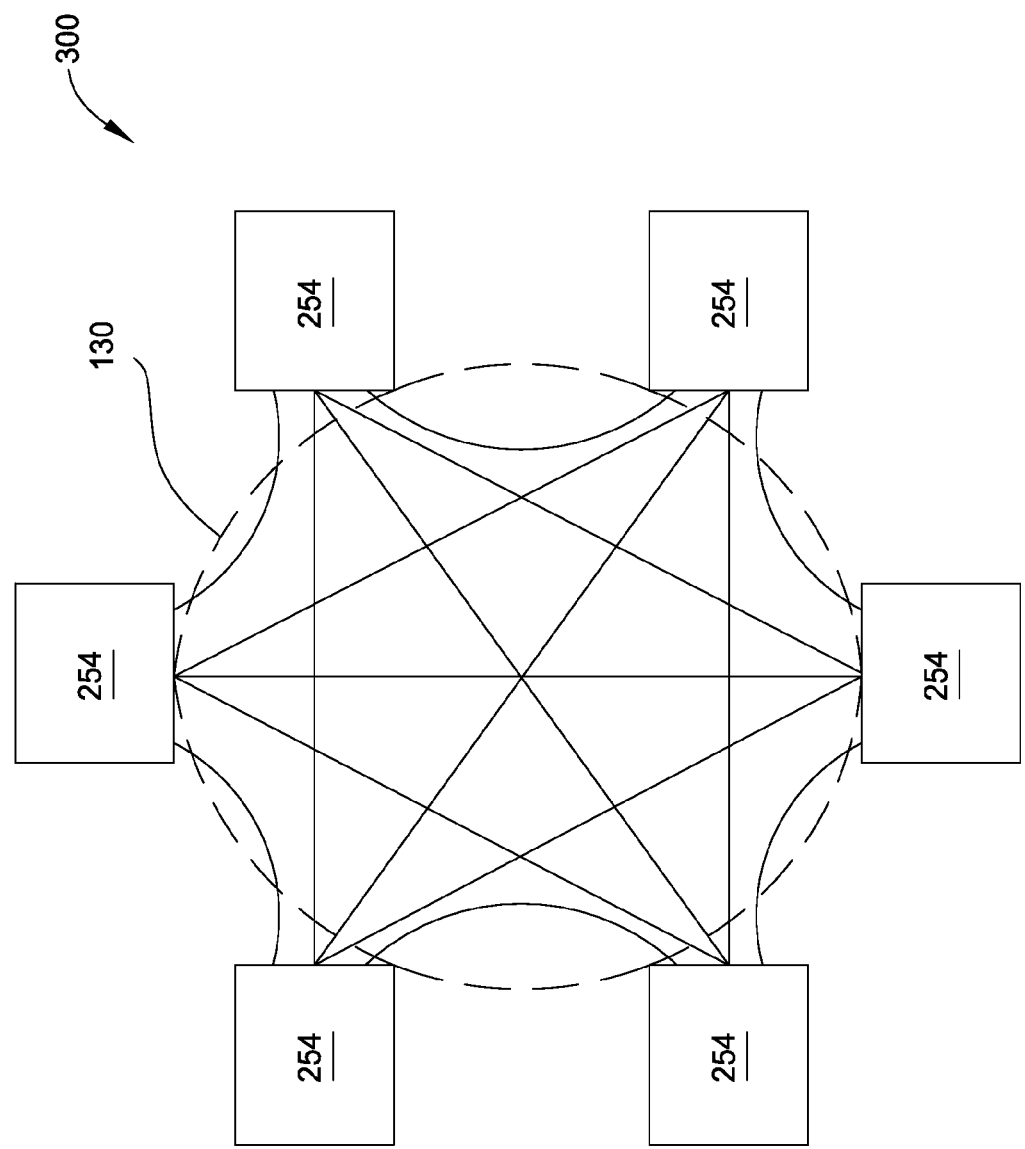
FIG. 3 illustrates a distributed, virtual switch, according to one embodiment described herein.

FIG. 3 illustrates a virtual switching layer, according to one embodiment described herein. As shown in the system 300, each sub-switch 254 in the systems 100 and 200 is connected to the other sub-switches 254 using the switching layer 130 via a mesh connection schema. That is, no matter the sub-switch 254 used, a cell (i.e., data packet) can be routed to another other sub-switch 254 located on any other switch module 250, 251, 252. This may be accomplished by directly connecting each of the bridge elements 120 of the sub-switches 254—i.e., each bridge element 120 has a dedicated data path to every other bridge element 120.

Figure 4:
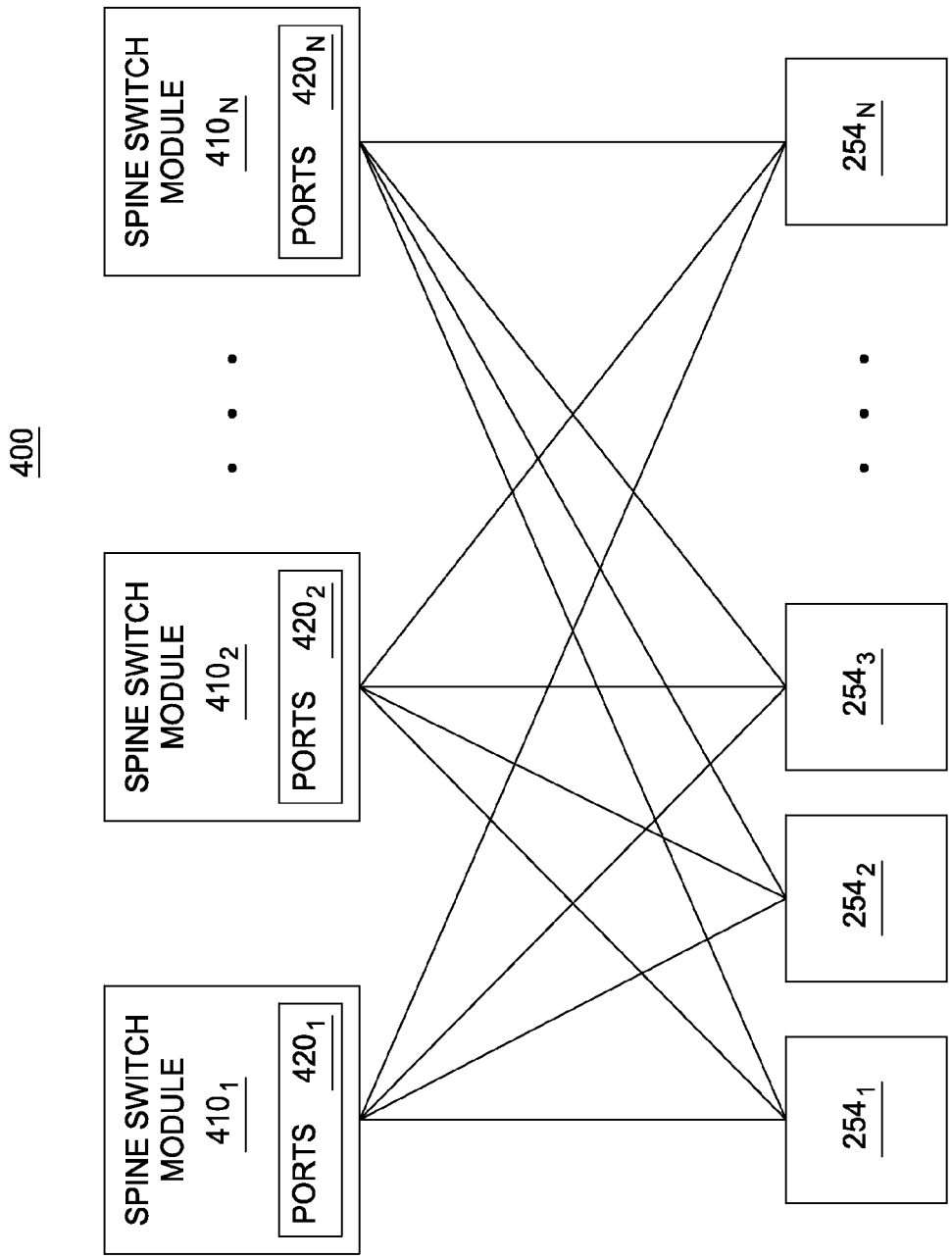
FIG. 4 illustrates a distributed, virtual switch, according to one embodiment described herein.

Alternatively, the switching layer 130 may use a spine-leaf architecture where each sub-switch 254 (i.e., a leaf node) is attached to at least one spine node. The spine nodes route cells received from the sub-switch 254 to the correct spine node which then forwards the data to the correct sub-switch 254. An example of this configuration is shown in FIG. 4, which illustrates a distributed, virtual switch, according to one embodiment described herein. Generally, the sub-switches $254_{1-N}$ may reside in one or more switch modules (e.g., switch modules 250, 251, 252). As shown in the system 400, each of the sub-switches $254_{1-N}$ is connected to each of the spine switch modules $410_{1-N}$ using the respective set of ports $410_{1-N}$. Thus, each of the sub-switches $254_{1-N}$ could communicate with each of the other sub-switches $254_{1-N}$ via a spine-leaf connection schema. Additionally, although the system 400 illustrates a two-level spine-leaf configuration, other configurations could have additional hierarchical levels of spine switch modules. For instance, a third level of spine switch modules could be provided above the depicted spine switch modules $410_{1-N}$, and the depicted spine switch modules $410_{1-N}$ could communicate with one another using the third level of spine switch modules.

Advantageously, increasing the number of hierarchical levels employed in the spine-leaf configuration allows the distributed switch to scale to larger sizes, without requiring individual switch modules (e.g., sub-switches $254_{1-N}$ and spine switch modules $410_{1-N}$) to have an increased number of ports. Such configurations may result in a relatively low cost distributed switch solution that includes a large quantity of inexpensive, low-port switch modules. However, such examples are without limitation and are provided for illustrative purposes only. Moreover, embodiments are not limited to any particular technique for interconnecting the sub-switches 254.

II. Event-Based Execution Buffer Management

Figure 5:
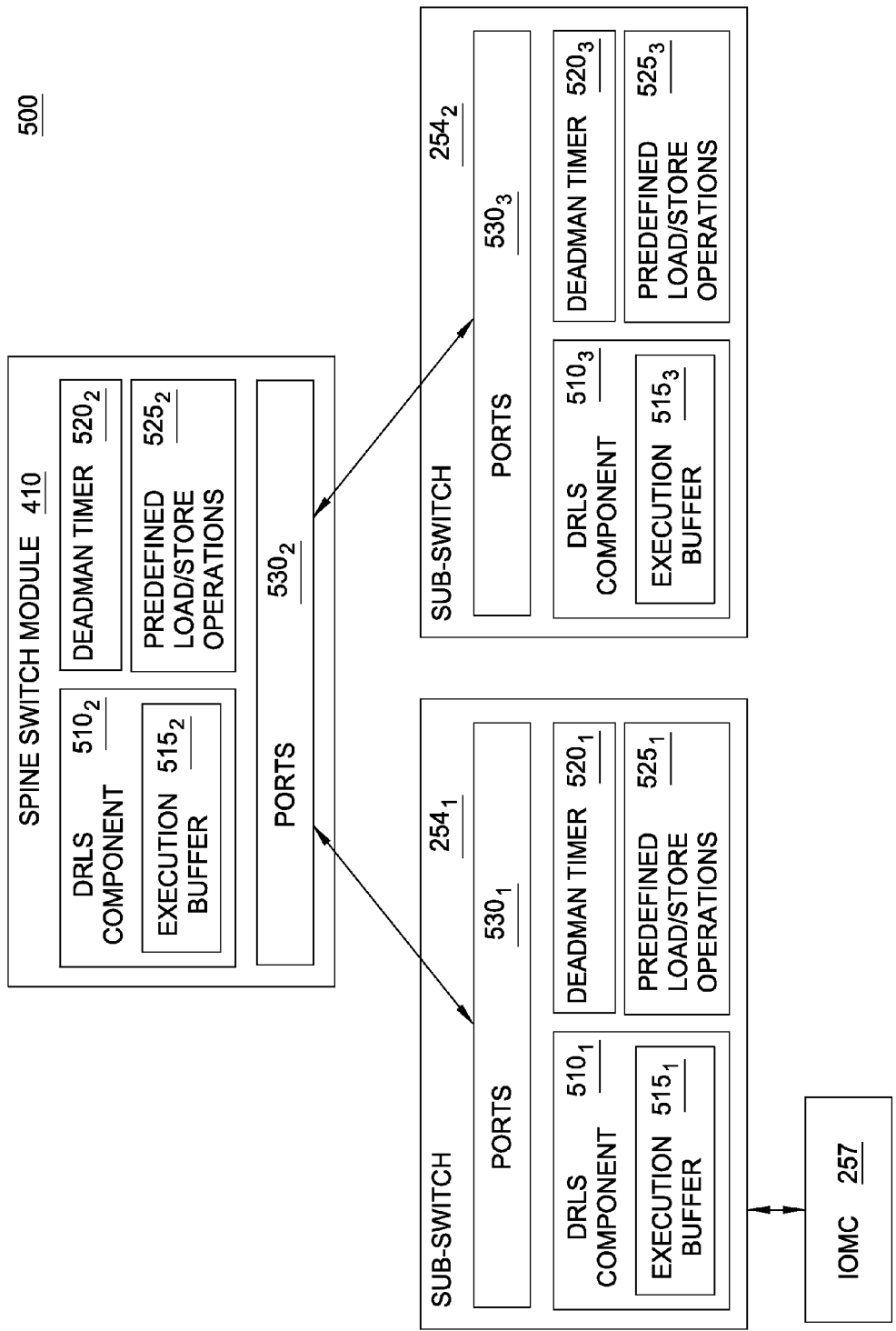
FIG. 5 illustrates a distributed, virtual switch configured with a DRLS component, according to one embodiment described herein.

As discussed above, embodiments provide techniques for reacting to events in a switch module. For instance, embodiments may be used to disable all the ports of a switch module (e.g., sub-switch 254, spine switch module 410, etc.) upon determining that connectivity to a switch management controller has been lost. FIG. 5 illustrates a distributed, virtual switch configured with a DRLS component, according to one embodiment described herein. As an initial note, although the system 500 illustrates a spine-leaf configuration for the distributed switch, as discussed above other configurations may be employed (e.g., the mesh connection schema in the system 300).

As shown, the system 500 includes sub-switch modules $254_{1-2}$ and a spine switch module 410. The system 500 also includes an IOMC 257 communicatively coupled to the sub-switch $254_1$. As discussed above, the IOMC 257 generally provides the control plane logic for each of the switch modules $254_{1-2}$ and 410. Additionally, each of the switch modules $254_{1-2}$ and 410 contains a respective set of ports $530_{1-3}$, a directed-route load/store (DRLS) component $510_{1-3}$, a deadman timer $520_{1-3}$, a set of predefined load/store operations $525_{1-3}$, and an event management component $540_{1-3}$. Additionally, each of the DRLS components $510_{1-3}$ contains an execution buffer $515_{1-3}$. As discussed above, each of the DRLS components $510_{1-3}$ may be configured to monitor their respective execution buffer $515_{1-3}$ and, upon detecting the respective execution buffer $515_{1-3}$ contains load/store operations, to execute the contents of the respective execution buffer $515_{1-3}$.

Generally, the predefined load/store operations 525 can, when executed, perform a variety of different operations on the respective switch module. For instance, each of the switch modules $254_{1-2}$ and 410 could contain a respective set of configuration registers, with each of the configuration registers indicative of a status of a respective one of the ports $530_{1-3}$. As an example, a configuration register could contain a value of "0" if the respective port is disable and a value of "1" is the respective port is enabled. In such an embodiment, a set of predefined load/store operations 525 could be adapted to disable all of the ports on the switch module by loading a value of "0" into each of the configuration registers on the switch module. More generally, however, it is broadly contemplated that the predefined load/store operations 525 may perform any operation on the switch module that is achievable using load/store operations.

In one embodiment, the IOMC 257 is configured to periodically transmit a heartbeat signal to each of the switch modules $254_{1-2}$ and 410. Receipt of the heartbeat signal may indicate to a switch module that the IOMC 257 itself is functioning and that the communication link between the IOMC 257 and the switch module is also functioning. Upon receiving the heartbeat signal, each event management component 540 may reset its respective deadman timer 520. Generally, the deadman timer 520 is set to expire after some period of time that, if no heartbeat signal is received for that period of time, indicates that the IOMC 257 is unavailable (e.g., because of a break in the communication link between the switch module and the IOMC 257, because the IOMC 257 is offline, etc.). For instance, the deadman timer 520 could be set to expire after some multiple of the period of the heartbeat signal (e.g., 3 times the period). As an example, if the IOMC 257 is configured to transmit a heartbeat signal every second, the deadman timer 520 could be configured to expire after 3 seconds (e.g., 3×1 second).

However, if the event management component 540 determines that its respective deadman timer 520 has expired, the event management component 540 may copy the predefined load/store operations 525 into the execution buffer 515 for execution. The DRLS component 510 may then detect the load/store operations within the execution buffer and execute the load/store operations. Thus, in the example discussed above, the DRLS component 510 could execute the load/store operations within the execution buffer 515, writing a value of "0" to each of the configuration registers on the switch module and thereby disabling all of the ports 530 on the switch module. Advantageously, doing so allows the switch module to perform a predefined operation (e.g., disabling all of the ports) responsive to the occurrence of a predefined event (e.g., loss of connectivity with the IOMC 257).

In one embodiment, the event management component 540 is configured to recognize a plurality of different events and to associate a respective set of predefined load/store operations 525 with each of the different events. For example, a first set of predefined load/store operations 525 could be associated with the expiration of the deadman timer 520 and a second set of predefined load/store operations 525 could be associated with receipt of an initialization signal. The event management component 540 could be configured to determine the appropriate set of predefined load/store operations 525, based on which event is detected. For example, upon receiving the initialization signal, the event management component 540 could be configured to copy the second set of predefined load/store operations 525 into the execution buffer for execution.

In some circumstances, the set of predefined load/store operations 525 may exceed the capacity of the execution buffer 515. In such a situation, the event management component 540 may copy a portion of the set of predefined load/store operations 525 into the execution buffer 515 for execution, and once the DRLS component 510 executes the portion of load/store operations, the event management component 540 may copy a next portion of the set of predefined load/store operations 525 into the execution buffer for execution. This process can be repeated until all of the predefined load/store operations are executed. Doing so allows the event management component 540 to handle any number of predefined load/store operations 525.

Figure 6:
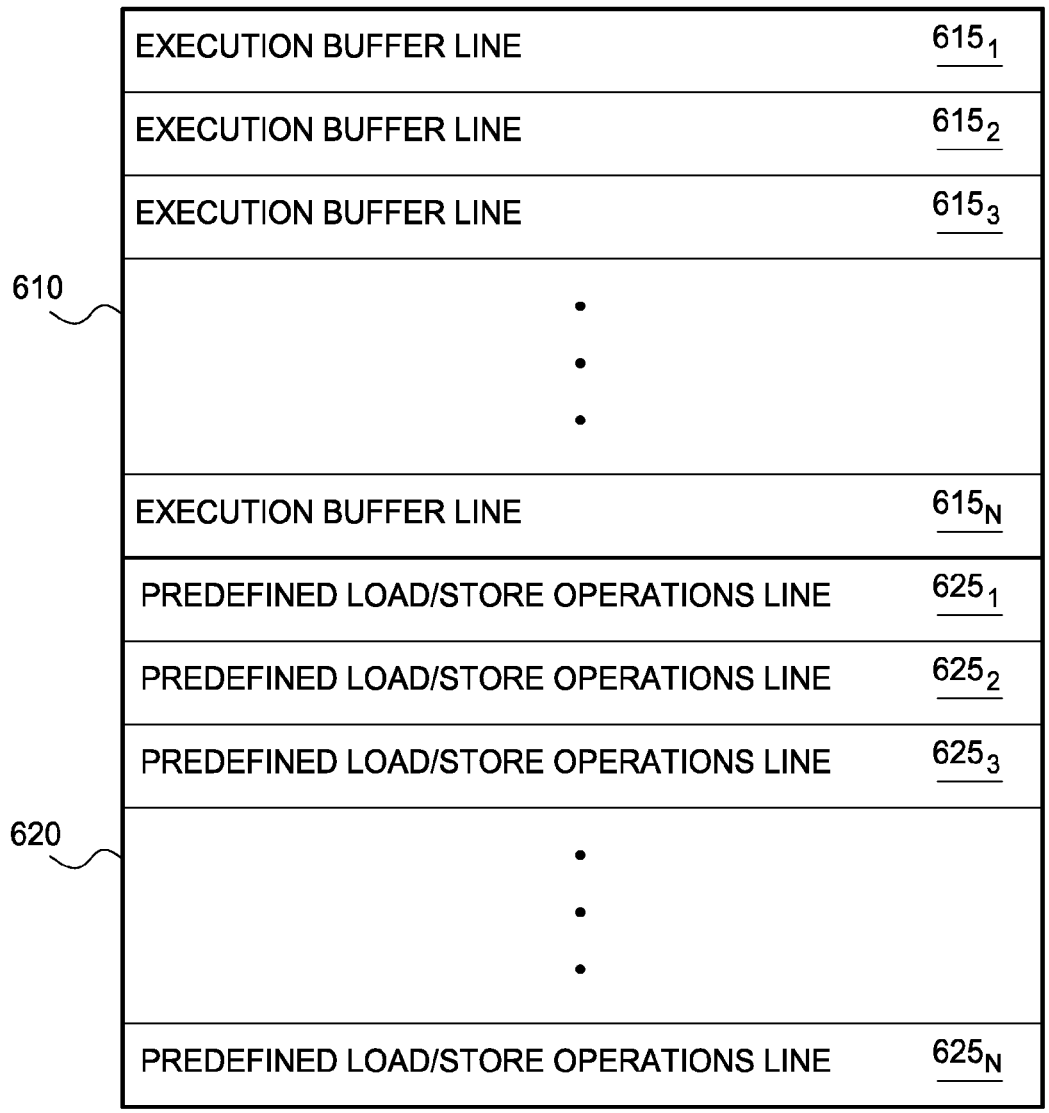
FIG. 6 illustrates an array containing an execution buffer, according to one embodiment described herein.

FIG. 6 illustrates an array containing an execution buffer, according to one embodiment described herein. As shown, the array 600 contains an execution buffer portion 610 and a predefined load/store operations portion 620. Generally, the array 600 represents an indexable memory having a defined capacity. For example, the array 600 could be an indexable memory on an application-specific integrated circuit (ASIC) (e.g., sub-switch 254 when implemented as an ASIC).

Returning to the depicted embodiment, the execution buffer portion 610 includes execution buffer lines $615_{1-N}$, and the predefined load/store operations portion 620 includes predefined load/store operations lines $625_{1-N}$.

As discussed above, a DRLS component 510 is generally configured to monitor the execution buffer 610 and, upon detecting load/store operations are contained within the buffer 610, to execute the load/store operations. The DRLS component 510 may monitor the contents of the execution buffer 610 in a variety of ways. For instance, the DRLS component 510 could employ a master sequencer and a number of sub-sequences to carry out this functionality, e.g., a master sequence, a transfer sub-sequencer and a processing sub-sequencer. As an example, the master sequencer could generally maintain an idle state until one of the predefined events occurs. Upon detecting an occurrence of an event, the master sequencer could leave the idle state and could advance to a transfer state. In response, the transfer sub-sequencer could leave its idle state and could transfer a pre-defined sequence of load/store operations into the execution buffer. At this point, the transfer sub-sequence could return to its idle state, and the master sequencer could advance to a processing state. Accordingly, the processing sub-sequencer could execute the contents of the execution buffer (i.e., the predefined sequence of load/store operations) and, once completed, could return to its idle state. Finally, the master sequencer could return to its idle state, until the next event is detected.

In one embodiment, the DRLS component 510 is configured to selectively modify the set of predefined load/store operations while copying the operations into the execution buffer. For instance, the DRLS component 510 could be configured to selectively replace certain operations within the set of load/store operations with a NOP operation, in order to prevent these certain operations from being executed. For example, assume that the set of predefined load/store operations are designed to disable all of the ports on a switch module by writing a value of "0" (e.g., using an AND load/store operation) to the respective configuration register associated with each of the ports. However, further assume that it is known (e.g., to a network administrator) that certain registers within a particular switch module are defective (e.g., as a result of the manufacturing process). In such an embodiment, the DRLS component 510 could be configured to selectively substitute NOP commands in place of any load/store operations associated with these defective registers, in order to avoid executing any load/store operations involving these defective registers. Advantageously, doing so allows the predefined sequence of load/store operations to be dynamically updated, based upon the current configuration of the switch module.

As another example, the DRLS component 510 could set the execution buffer lines $615_{1-N}$ to a default value (e.g., "0") and could poll the execution buffer lines $615_1$ to determine if any of the lines $615_{1-N}$ contain a value other than the default value. If so, the DRLS component 510 could execute the load/store operations stored within the lines storing a non-default value, and could then reset the lines back to the default value. More generally, however, any technique for detecting when the buffer 610 contains load/store operations may be used.

In the depicted example, the execution buffer 610 is stored within the array 600, but does not use the entire capacity of the array 600. As such, the remaining portion 620 of the array 600 has been used to store a set of predefined load/store operations. Advantageously, by using the excess capacity 620 within the array 600 to store the predefined load/store operations 525, embodiments can more efficiently use memory on the switch module.

As discussed above, the event management component 540 is configured to recognize and respond to multiple types of predefined events. For instance, the event management component 540 may associate a different group of predefined load/store operations with each of the predefined events and, upon detecting an occurrence of one of the predefined events, the event management component 540 could copy the associated group of predefined load/store operations into the execution buffer 610.

Figure 7:
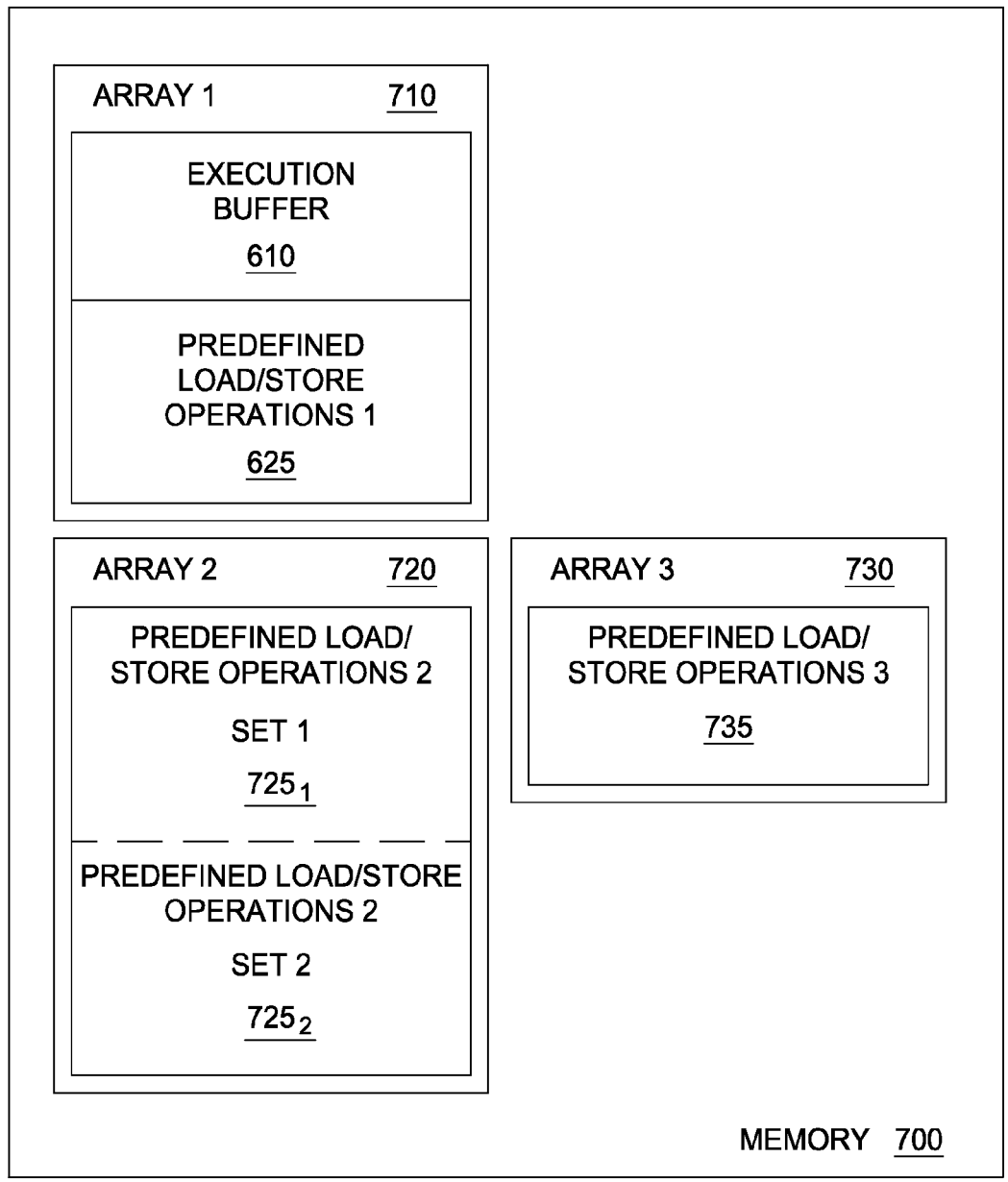
FIG. 7 illustrates a set of arrays, according to one embodiment described herein.

An example of this is depicted in FIG. 7, which illustrates a set of arrays, according to one embodiment described herein. As shown, the system 700 includes a first array 710, a second array 720 and a third array 730. As discussed above, arrays in this context refer to indexable memories of some defined capacity. For instance, the arrays 710, 720 and 730 could be dedicated, indexable memories on an ASIC (e.g., sub-switch 254 when implemented as an ASIC). Here, a first portion 610 of the first array 710 is used as the execution buffer, while the remaining portion 625 is used to store a first group of predefined load/store operations (similar to the array 600 shown in FIG. 6). Additionally, the second array 720 has been used to store a second, larger group of predefined load/store operations, with a first portion $725_1$ of the array 720 storing one set of predefined load/store operations and the second portion $725_2$ of the array 720 storing another set of predefined load/store operations. Finally, the third array 730 in the depicted embodiment is used to store only the third group of predefined load/store operations.

For the sake of example, assume that the first group of predefined load/store operations 625 is associated with the expiration of a deadman timer 520 (i.e., a first predefined event), the second group of predefined load/store operations 725 is associated with receipt of an initialization signal (i.e., a second predefined event), and the third group of predefined load/store operations 735 is associated with a particular debug event (i.e., a third predefined event). Upon detecting one of the predefined events, the event management component 540 could copy the associated group of predefined load/store operations into the execution buffer 610 for execution. For instance, upon determining that the particular debug event has occurred, the event management component 540 could copy the third group of predefined load/store operations 735 into the execution buffer 610. The DRLS component 510 could then detect and execute the load/store operations within the execution buffer 610.

In some situations, a group of predefined load/store operations exceeds the capacity of the execution buffer 610. For instance, as shown, the second group of predefined load/store operations 725 is twice the capacity of the execution buffer 610, and thus the event management component 540 cannot physically copy the entirety of the operations 725 into the execution buffer 610 at once. In such a situation, the event management component 540 could be configured to copy the first set of predefined load/store operations $725_1$ into the execution buffer 610 (where the size of the first set $725_1$ is at most the capacity of the execution buffer 610). The event management component 540 could detect when the DRLS component 510 has executed the first set of operations $725_1$ in the execution buffer, and could then copy the second set of predefined load/store operations $725_2$ into the execution buffer 610 (again, where the size of the second set $725_2$ is at most the capacity of the execution buffer 610).

Figure 8:
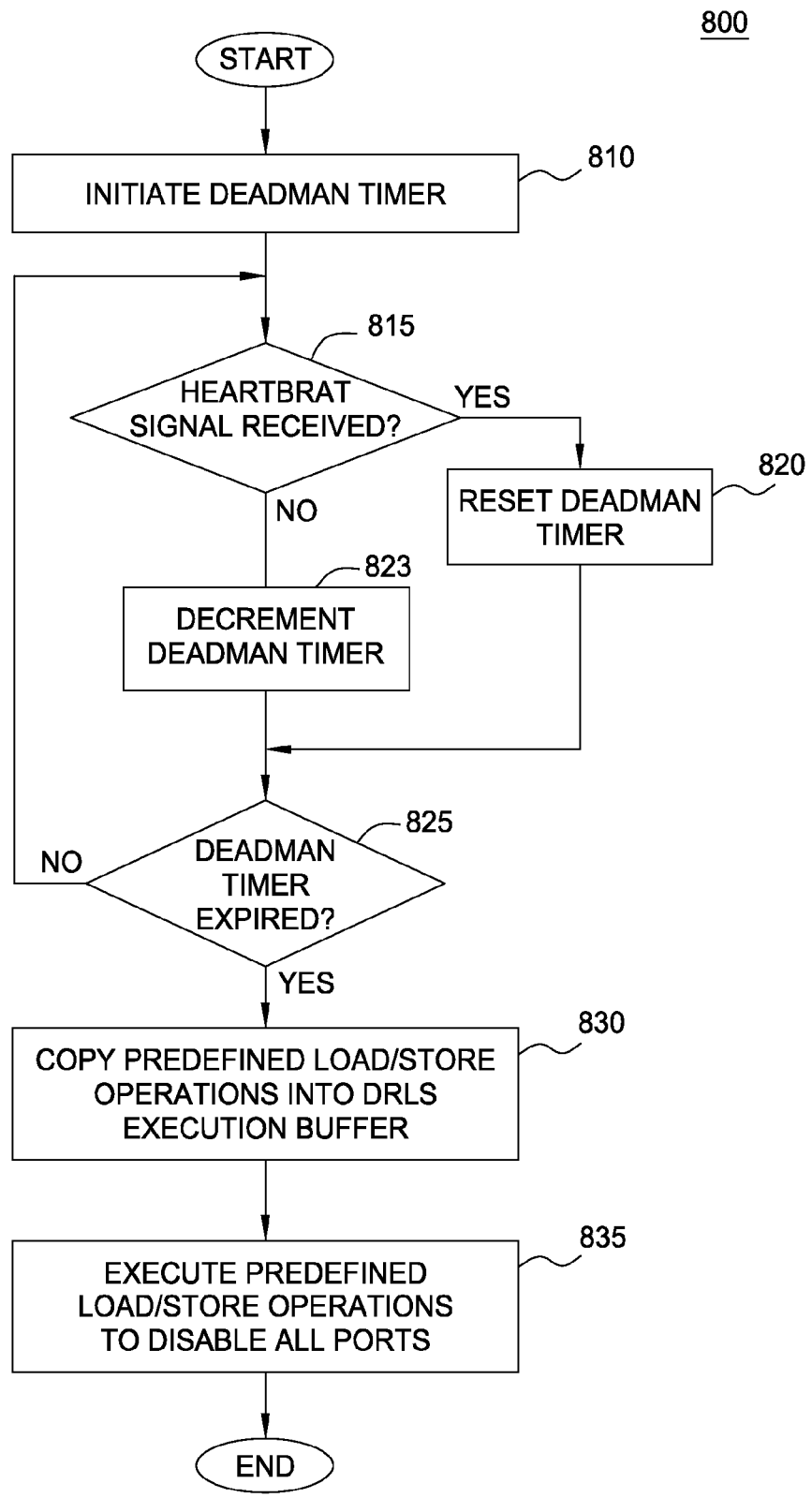
FIG. 8 is a flow diagram illustrating a method for reacting to events in a distributed switch module, according to one embodiment described herein.

FIG. 8 is a flow diagram illustrating a method for reacting to events in a distributed switch module, according to one embodiment described herein. As shown, the method 800 begins at block 810, where the event management component 540 initiates a deadman timer. As discussed above, the expiration of such a timer can be indicative of an occurrence of some predefined event. In the current example, assume that the deadman timer is indicative of connectivity with the IOMC 257, and that expiration of the deadman timer indicates that the connection with the IOMC 257 has been lost.

At block 815, the event management component 540 determines whether a heartbeat signal has been received from the IOMC 257. If the heartbeat signal has not been received, the event management component 540 decrements the deadman timer value (block 823). If the heartbeat signal has been received, the event management component 540 resets the deadman timer (block 820). For instance, the deadman timer could initially be set to a value of "180" and the event management component 540 could be configured to decrement the deadman timer every second, so that the deadman timer expires (e.g., reaches "0" in this example) after 180 seconds. Upon receiving the heartbeat signal from the IOMC 257, the event management component 540 could reset the deadman timer to the value of "180".

The event management component 540 then determines whether the deadman timer has expired (block 825). If not, the method 800 returns to block 815, where the event management component 540 determines whether a heartbeat signal is received. If instead the event management component 540 determines that the deadman timer has expired, the event management component 540 copies a set of predefined load/store operations into the DRLS execution buffer (block 830). In the present example, the set of predefined load/store operations are configured to disable all ports on the sub-switch. The DRLS component 510, upon detecting load/store operations have been copied to the DRLS execution buffer, then executes the predefined load/store operations (block 835) and the method 800 ends.

Figure 9:
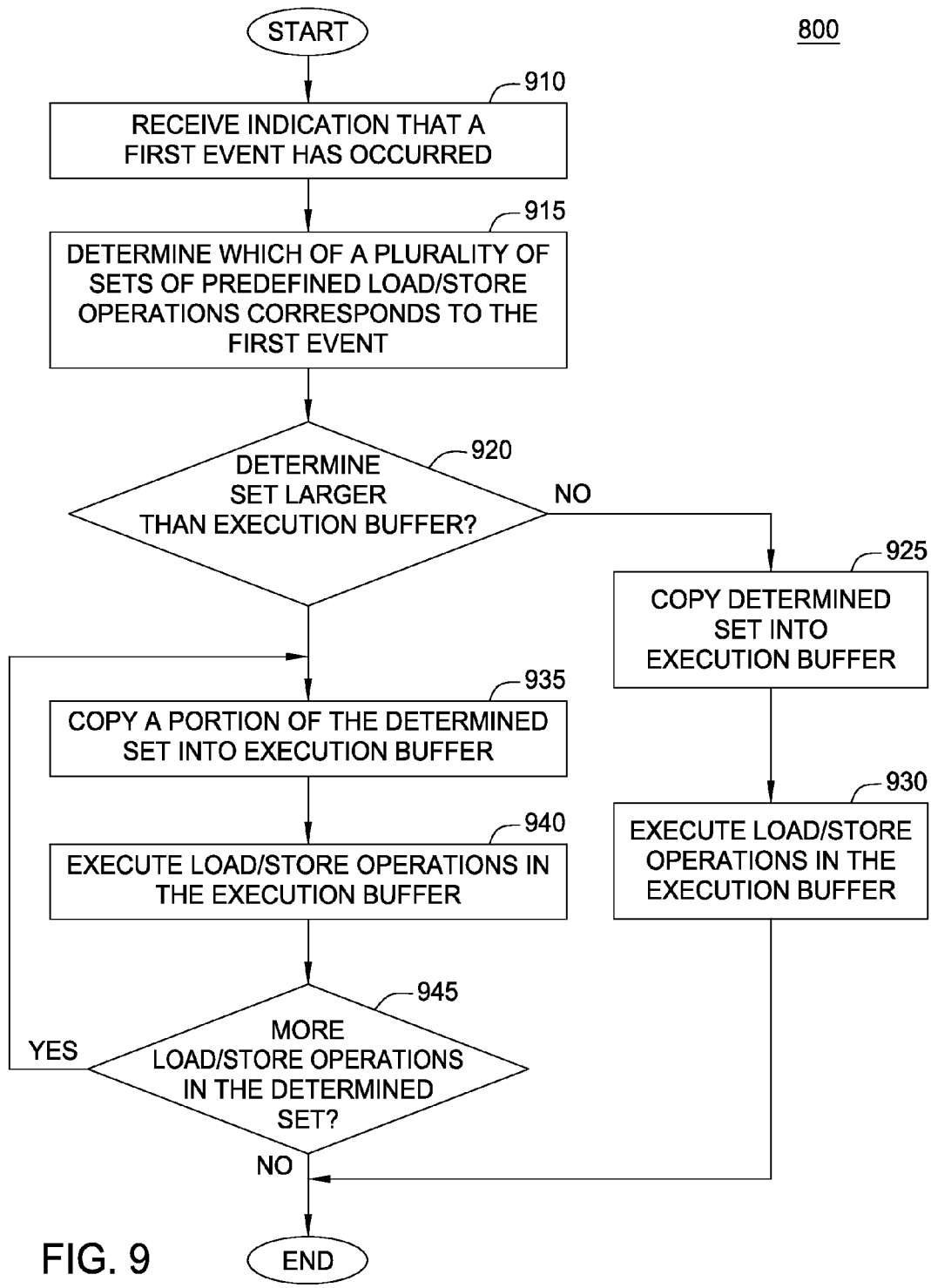
FIG. 9 is a flow diagram illustrating a method for reacting to events in a distributed switch module, according to one embodiment described herein.

As discussed above, the event management component 540 may be configured to recognize multiple, different events and to associate each of these events with a respective set of load/store operations. An example of this is shown in FIG. 9, which is a flow diagram illustrating a method for reacting to events in a distributed switch module, according to one embodiment described herein. As shown, the method 900 begins at block 910, where the event management component 540 receives an indication that a first event has occurred. The event management component 540 then determines which set of predefined load/store operations, from a plurality of different sets of predefined load/store operations, corresponds to the first event (block 915). For example, if the first event represents a loss of connectivity with the IOMC 257, the event management component 540 could determine that this event is associated with a set of load/store operations configured to disable all ports on the sub-switch. As another example, if the first event is a debug event, the event management component 540 could determine that the debug event is associated with a set of load/store operations that store the contents of all registers on the sub-switch. More generally, any type of event and any set of load/store operations can be used, consistent with the functionality described herein.

The event management component 540 then determines whether the set of predefined load/store operations is larger than the DRLS execution buffer (block 920). If not, the event management component 540 copies the set of predefined load/store operations into the DRLS execution buffer (block 925). The DRLS component 510, upon detecting that load/store operations have been written to the DRLS execution buffer, then executes the load/store operations in the buffer (block 930), and the method 900 ends.

If instead the event management component 540 determines that the set of predefined load/store operations is larger than the DRLS execution buffer, the event management component 540 copies a portion of the set of predefined load/store operations into the DRLS execution buffer (block 935). The DRLS component 510, upon detecting that load/store operations have been written to the DRLS execution buffer, executes the load/store operations within the buffer (block 945). The event management component 540 then determines whether there are additional load/store operations within the set of predefined load/store operations that have not yet been executed (block 945). If so, the method 900 returns to block 935, where the event management component 540 copies a next portion of the set of predefined load/store operations into the DRLS execution buffer. If instead the event management component 540 determines that all of the predefined load/store operations have been executed, the method 900 ends.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud being run or stored on the servers. For example, an application could execute on a server implementing the virtual switch in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-readable storage medium containing a program that, when executed, performs an operation for reacting to events in a switch module, comprising:
   providing (i) a plurality of predefined load/store operations stored in a first memory buffer of the switch module and (ii) an execution buffer capable of storing load/store operations within the switch module;
   responsive to detecting that a first predefined event has occurred, copying the plurality of predefined load/store operations from the first memory buffer to the execution buffer for execution; and upon detecting the plurality of predefined load/store operations within the execution buffer, executing the plurality of predefined load/store operations within the execution buffer.

2. The computer-readable storage medium of claim 1, the operation further comprising:
monitoring the execution buffer to determine when the execution buffer contains one or more load/store operations.

3. The computer-readable storage medium of claim 1, wherein the first predefined event is the expiration of a timer, and the operation further comprising:
providing a timer configured to expire after a predetermined period of time; and
upon receiving a heartbeat signal from a switch management controller, resetting the timer to expire after the predetermined period of time.

4. The computer-readable storage medium of claim 1, wherein the switch module includes one or more registers, and wherein each of the load/store operations relate to at least one of writing, reading and modifying one or more values within the one or more registers.

5. The computer-readable storage medium of claim 1, wherein the switch module includes one or more ports, and wherein each of the one or more ports is associated with a respective register indicative of whether the port is enable or disabled, and wherein the plurality of predefined load/store operations are configured to manipulate one or more values within the one or more registers to disable all of the one or more ports.

6. The computer-readable storage medium of claim 1, wherein the first predefined event is one of a plurality of predefined events, and wherein each of the plurality of predefined events is associated with a respective set of load/store operations.

7. The computer-readable storage medium of claim 1, wherein copying the plurality of predefined load/store operations from the first memory buffer to the execution buffer for execution further comprises:
upon determining that the plurality of predefined load/store operations exceed the capacity of the execution buffer:
copying a portion of the plurality of predefined load/store operations into the execution buffer; and
executing the load/store operations in the execution buffer,
wherein the copying and executing are repeated until all of the plurality of predefined load/store operations have been copied into the execution buffer.

8. The computer-readable storage medium of claim 1, wherein copying the plurality of predefined load/store operations from the first memory buffer to the execution buffer for execution further comprises:
selectively manipulating at least one of the predefined load/store operations within the plurality of predefined load/store operations, before the plurality of predefined load/store operations are copied into the execution buffer.

9. A switch module, comprising:
a processor; and
a memory containing a program that, when executed by the processor, performs an operation for reacting to events in a switch module, comprising:
providing (i) a plurality of predefined load/store operations stored in a first memory buffer of the switch module and (ii) an execution buffer capable of storing load/store operations within the switch module;
responsive to detecting that a first predefined event has occurred, copying the plurality of predefined load/store operations from the first memory buffer to the execution buffer for execution; and
upon detecting the plurality of predefined load/store operations within the execution buffer, executing the plurality of predefined load/store operations within the execution buffer.

10. The switch module of claim 9, the operation further comprising:
monitoring the execution buffer to determine when the execution buffer contains one or more load/store operations.

11. The switch module of claim 9, wherein the first predefined event is the expiration of a timer, and the operation further comprising:
providing a timer configured to expire after a predetermined period of time; and
upon receiving a heartbeat signal from a switch management controller, resetting the timer to expire after the predetermined period of time.

12. The switch module of claim 9, wherein the switch module further includes one or more registers, and wherein each of the load/store operations relate to at least one of writing, reading and modifying one or more values within the one or more registers.

13. The switch module of claim 9, wherein the switch module includes one or more ports, and wherein each of the one or more ports is associated with a respective register indicative of whether the port is enable or disabled, and wherein the plurality of predefined load/store operations are configured to manipulate one or more values within the one or more registers to disable all of the one or more ports.

14. The switch module of claim 9, wherein the first predefined event is one of a plurality of predefined events, and wherein each of the plurality of predefined events is associated with a respective set of load/store operations.

15. The switch module of claim 9, wherein copying the plurality of predefined load/store operations from the first memory buffer to the execution buffer for execution further comprises:
upon determining that the plurality of predefined load/store operations exceed the capacity of the execution buffer:
copying a portion of the plurality of predefined load/store operations into the execution buffer; and
executing the load/store operations in the execution buffer,
wherein the copying and executing are repeated until all of the plurality of predefined load/store operations have been copied into the execution buffer.

16. The switch module of claim 9, wherein copying the plurality of predefined load/store operations from the first memory buffer to the execution buffer for execution further comprises:
selectively manipulating at least one of the predefined load/store operations within the plurality of predefined load/store operations, before the plurality of predefined load/store operations are copied into the execution buffer.

* * * * *